United States Patent [19]

Fukuda et al.

[11] Patent Number: 4,567,086
[45] Date of Patent: Jan. 28, 1986

[54] CARBONACEOUS, FIVE-LAYER FUEL CELL ELECTRODE SUBSTRATE WITH ELONGATED HOLES FOR FEEDING REACTANT GASES

[75] Inventors: Hiroyuki Fukuda; Masatomo Shigeta; Hisatsugu Kaji, all of Iwaki; Kuniyuki Saitoh, Abiko, all of Japan

[73] Assignee: Kureha Kagaku Kogyo Kabushiki Kaisha, Tokyo, Japan

[21] Appl. No.: 718,382

[22] Filed: Apr. 1, 1985

[30] Foreign Application Priority Data

Apr. 4, 1984 [JP] Japan .................................. 59-68059

[51] Int. Cl.$^4$ ............................ B32B 3/12; B32B 9/00
[52] U.S. Cl. ..................................... 428/166; 428/167; 428/172; 428/218; 428/312.2; 428/316.6; 428/408
[58] Field of Search ............... 428/166, 167, 172, 218, 428/304.4, 312.2, 316.6, 408

[56] References Cited

U.S. PATENT DOCUMENTS

| 3,222,697 | 12/1965 | Scheermesser | 428/166 |
| 4,442,165 | 4/1984 | Gebhardt et al. | 428/312.2 |
| 4,455,334 | 6/1984 | Ogino et al. | 428/312.2 |
| 4,456,645 | 6/1984 | Chi | 428/167 |

FOREIGN PATENT DOCUMENTS

| 1142891 | 2/1969 | United Kingdom . |
| 1240793 | 7/1971 | United Kingdom . |
| 1524379 | 9/1978 | United Kingdom . |
| 2023916 | 1/1980 | United Kingdom . |
| 2107108 | 4/1983 | United Kingdom . |
| 2128395 | 4/1984 | United Kingdom . |

*Primary Examiner*—William J. Van Balen
*Attorney, Agent, or Firm*—Cushman, Darby & Cushman

[57] ABSTRACT

Disclosed herein is an electrode substrate for fuel cells which has an integratedly press molded five-layer structure comprising a porous carbonaceous layer, a dense carbonaceous layer having a bulk density larger than the porous layer, a separator, a dense carbonaceous layer having a bulk density larger than the porous layer, and a porous carbonaceous layer, and which further comprises a number of elongated holes for feeding reactant gases into a fuel cell in the interface between the porous layer and the dense layer. The processes for preparing the electrode substrates are also provided according to the present invention.

5 Claims, 5 Drawing Figures

CARBONACEOUS, FIVE-LAYER FUEL CELL ELECTRODE SUBSTRATE WITH ELONGATED HOLES FOR FEEDING REACTANT GASES

FIELD OF THE INVENTION

This invention relates to a fuel cell electrode substrate, and more particularly, to a carbonaceous electrode substrate for fuel cells which has a five-layered structure comprising a porous carbonaceous layer, a dense carbonaceous layer, a gas impermeable separator, a dense carbonaceous layer and a porous carbonaceous layer and further comprises a number of elongated holes for feeding reactant gases to a fuel cell prepared therefrom in the interface between the porous layer and the dense layer. The invention also relates to processes for preparation of such electrode substrates, as well as to fuel cells prepared from the electrode substrates.

BACKGROUND OF THE INVENTION

Bipolar type fuel cells are known which have a ribbed bipolar separator prepared from an impermeable thin plate of graphite.

On the other hand, ribbed electrode substrates for monopolar fuel cells have been developed which have a ribbed surface and a flat surface to be in contact with a catalyst layer. Such an electrode substrate is carbonaceous and porous as a whole.

A typical structure of a unit cell in a conventional monopolar fuel cell using such an electrode substrate is illustrated in FIG. 1. The unit cell is composed of two electrode substrates 1, two catalyst layers 2, a matrix layer 3 impregnated with an electrolyte, and two separator sheets 4 to be in contact with ribs 5 of the substrate 1. Such unit cells are stacked to make a fuel cell. Reactant gases, i.e hydrogen as a fuel gas and oxygen or air, are fed via channels formed by the ribs 5 and the separator sheet 4 and the gases diffuse in the porous electrode substrate 1 from the ribbed surface to the flat surface to reach the catalyst layer 2 and react there.

For preparing such an electrode substrate, the following methods which have been previously proposed may be available. For example, one method for preparing general electrode substrates has been proposed in Japanese Patent Application Laying Open No. 117649/83, wherein mixtures based on short, carbonaceous fibers are pressed into porous shaped articles. Another method is described in Japanese Patent Publication No. 18603/78, in which a machined paper of carbon fibers is impregnated with an organic polymer solution and made into a porous carbon fiber paper. A still another method for preparing an electrode substrate was proposed in U.S. Pat. No. 3,829,327, wherein a web of carbon fiber is subjected to chemical vapor deposition of carbon to make a porous electrode substrate. All electrode substrates prepared by these methods have a substantially homogeneous monolayer structure.

However, such homogeneous monolayer electrode substrates may exhibit some demerits such as follows: with higher bulk densities of substrates, a sufficiently high limiting current density cannot be obtained due to less diffusion of reactant gases in a fuel cell prepared therefrom and premature reduction of the performance of the fuel cell may occur due to an insufficient amount of electrolytes held in the substrate, in other words, the life of the fuel cell is short; on the other hand, with lower bulk densities of electrode substrates, their electric and thermal resistances will be too high and/or the mechanical strength such as bending strength will be too low.

Moreover, in an electrode substrate with ribs, the section modulus thereof is reduced due to a ribbed surface, which is not flat as seen from FIG. 1, and stress is concentrated at the sharp edges 6 of the ribs 5 resulting in insufficient mechanical strength of the whole electrode substrate. A thick substrate is, therefore, inevitably required in order to obtain a sufficiently strong shaped substrate: that is, the resistance of the substrate against diffusion of reactant gases through the substrate from the ribbed surface to the flat surface is increased. In addition, it is difficult to obtain complete flatness of the top surface of the ribs and the incomplete flatness of the ribs' top causes significantly large electric and thermal contact resistances between the ribs' top surface and a separator sheet. As generally known, such a contact resistance may be occasionally several times larger than the conductive resistance in the substrate, and therefore, a conventional monopolar electrode substrate may cause lack of uniform temperature distribution in a fuel cell and electric current generation efficiency thereof will be low due to said large contact resistance.

OBJECTS OF THE INVENTION

It is an object of the present invention to provide an electrode substrate for fuel cells without such demerits of conventional substrates.

Another object of the invention is to provide a fuel cell electrode substrate without ribs.

A still another object of the invention is to provide an electrode substrate which has a number of elongated holes for feeding reactant gases to a fuel cell.

It is another object of the present invention to provide a fuel cell electrode substrate which has a five-layer structure comprising a porous layer, a dense layer, a separator, a dense layer and a porous layer, these five layers being integrated as a whole body.

It is a still another object of the invention to provide an electrode substrate for fuel cells which require no additional separator sheet for stacking the substrates.

These and other objects of the invention will be apparent for those skilled in the art from the following detailed description.

SUMMARY OF THE INVENTION

The electrode substrate for fuel cells provided according to the invention comprises a porous carbonaceous layer, a dense carbonaceous layer having a larger bulk density than that of the porous layer, a separator, a dense carbonaceous layer and a porous carbonaceous layer, wherein these five layers are integrated as a whole body. The substrate of the invention incorporates a number of elongated holes for feeding reactant gases into a fuel cell prepared therefrom in the interface between the porous layer and the dense layer. Tne processes for preparing such an electrode substrate are also provided according to the present invention.

BRIEF DESCRIPTION OF THE DRAWINGS

The present invention will be fully described with reference to the attached drawings. Among the drawings.

In the drawings, the parts having the same function are indicated by the same numeral.

DESCRIPTION OF THE PREFERRED EMBODIMENTS

Figure 1:
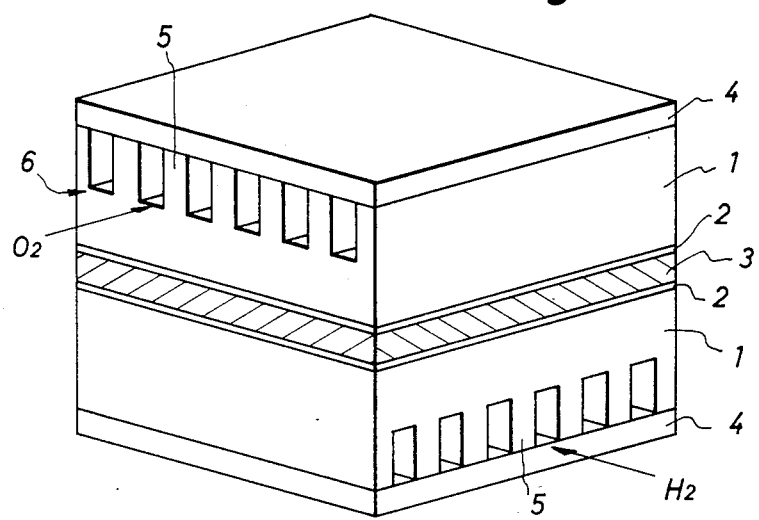
FIG. 1 illustrates a typical structure of a unit cell in a monopolar fuel cell according to the prior art.
Figure 2:
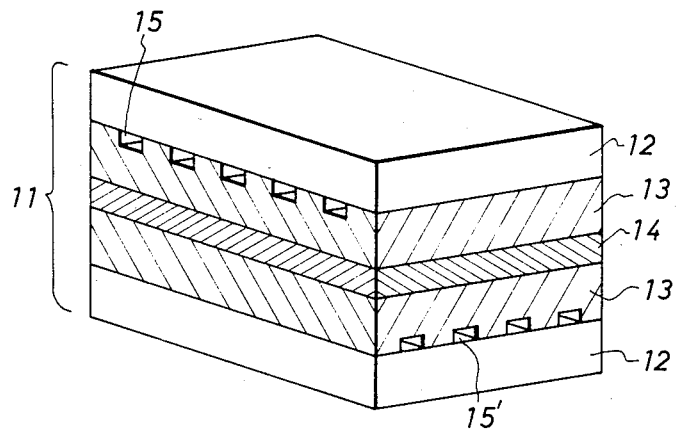
FIG. 2 illustrates the structure of an electrode substrate according to the present invention.
Figure 3:
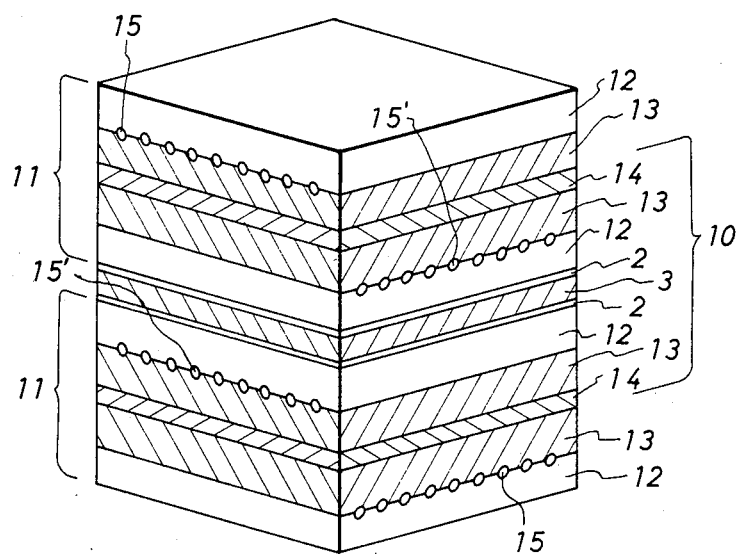
FIG. 3 is a schematic view of a partial construction of a fuel cell comprising two electrode substrates of the invention stacked with two catalyst layers and one matrix layer.

FIG. 2 is an explanatory view of the electrode substrate 11 according to the present invention, and FIG. 3 is an explanatory view of a partial construction of a fuel cell comprising two electrode substrates 11 of the invention, two catalyst layers 2 and one matrix layer 3, stacked with each other as shown. In FIG. 3, the unit corresponding to the unit cell of the prior art as shown in FIG. 1 is indicated by the numeral 10.

As shown in FIGS. 2 and 3, the electrode substrate 11 of the present invention comprises a porous carbonaceous layer 12, a dense carbonaceous layer 13 having a larger bulk density than that of the porous layer 12, and an impermeable separator 14, another, dense carbonaceous layer 13, and another porous carbonaceous layer 12. Thus, the electrode substrate 11 of the invention has a five-layer structure. These five layers are stacked in the above-stated order and integrated as a whole body, as shown in FIG. 2.

The substrate 11 has a number of holes 15, 15' which are elongated in the interface between the porous layer 12 and the dense layer 13 continuously from one side surface of a fuel cell to the other opposite side surface thereof in the electrode substrate 11. The elongated holes 15, 15' form paths for feeding reactant gases, i.e. hydrogen or oxygen or air, into a fuel cell. Each hole in these elongated holes 15 or 15' is substantially parallel to each other in the group of the holes, and to an electrode surface and one side surface having no openings of the holes of the electrode surface which is of course different from the above-said side surfaces having openings of the holes. As shown in FIGS. 2 and 3, with the electrode substrate 11 of the present invention, the longitudinal direction of the elongated holes 15 in one side of the separator 14 is perpendicular to the direction of the elongated holes 15' in the other side of the separator 14. In FIG. 3, one electrode substrate is piled on another electrode substrate while holding two catalyst layers 2, a matrix 3, thereby forming a partial construction of a fuel cell having a unit cell 10, wherein the direction of the elongated holes 15 and 15' are perpendicular to each other.

The "electrode surface" used herein refers to the uppermost or lowermost surface of the electrode substrate shown in FIG. 2 or 3. The "side surface" of a fuel cell or electrode substrate used herein refers to the side surfaces of the fuel cell or the substrate other than the said electrode surfaces, as shown in Figures.

Each of the elongated holes 15, 15' for feeding reactant gases has a cross section in any form, for example, rectangular as shown in FIG. 2, circular as shown in FIG. 3, or in any other form. The cross sectional area of each elongated hole 15, 15' is preferably in the range of from about 0.2 to about 7 mm². In the holes 15, 15' with a circular cross section as shown in FIG. 3, their diameter will be in the range of from 0.5 to 3 mm. On the other hand, when the holes 15, 15' have any cross sectional form other than circular, a diameter of a circle having the same area as their cross sectional area may be considered to be in the above-specified range, this diameter being hereinafter referred to as a "equivalent diameter" of elongated holes with any cross sectional form other than circular. Holes with smaller sizes will give too high resistance to the feed flow of reactant gases. In the case where the elongated holes with smaller sizes are formed in an electrode substrate of a large area, the resistance to the feed flow of reactant gases becomes too high because of the small diameter and the long span of the elongated holes through the electrode substrate. On the other hand, holes with larger sizes will necessarily cause increase in thicknesses of porous and dense layers resulting in reduction of volume efficiency of a fuel cell prepared therefrom.

The porous layer 12 of the electrode substrate 11 is uniformly porous and carbonaceous. Preferably, the porous layer 12 has an average bulk density in the range of from 0.4 to 0.8 g/cm³ and a specific gas permeability to reactant gases of 20 ml/cm.hr.mmAq. or more. A porous layer having an average bulk density and a gas permeability in the above-specified ranges, respectively, will have a desired mechanical strength such as bending strength and a desired gas diffusion resistance. Preferably, the porosity of the porous layer 12 may be in the range of from 50 to 80%. Pores in the porous layer 12 are open pores, and preferably, 60% or more of the pores have a diameter in the range of from 5 to 50 micrometers.

The dense layer 13 of the electrode substrate 11 has preferably an average bulk density in the range of from 0.5 to 1.0 g/cm³. Since the permeability of the dense layer 13 to reactant gases is significantly low, the reactant gases will substantially diffuse only through the porous layer 12 and the thickness of the dense layer will be significantly reduced. Further, the mechanical strength, e.g. bending strength, of the electrode substrate 11 may be markedly improved.

Preferably, the thickness of the porous layer 12 is in the range of from a fiftieth to a half of the total thickness of the porous layer 12 plus the dense layer 13.

The separator 14 of the electrode substrate 11 preferably has an average bulk density of 1.0 g/cm³ or more and a gas permeability of 0.2 ml/cm.hr.mmAq. or less. If the average bulk density is less than 1.0 g/cm³, desired compactness as a separator cannot be obtained.

The electrode substrates of the present invention may be prepared by the processes also provided according to the invention which will be described in detail hereinafter.

The process of the invention for preparing an electrode substrate for fuel cells comprises: feeding a material for a porous layer, a material for forming elongated holes, a material for a dense layer, a material for a separator, a material for a dense layer, a material for forming elongated holes, and a material for a porous layer, in this order, into a mold with a proper configuration; press molding the materials; postcuring the molded product; and calcining the cured product.

The materials for porous layers which may be used in the invention may be mixtures comprising 10–50% by weight of a filler, such as short carbon fibers, carbon particles and the like, 20–40% by weight of a binder, such as phenol resins, epoxy resins, petroleum and/or coal pitches and mixtures thereof, and 20–50% by weight of a pore regulator, such as polyvinyl alcohols, polystyrenes, polyethylenes, polypropylenes, polyvinyl chlorides and mixtures thereof.

Preferably, the short carbon fibers employed as a filler in the invention have a diameter in the range of from 5 to 30 microns and a fiber length in the range of from 0.02 to 2 mm. With carbon fibers having a length of more than 2 mm, the fibers tangle with one another to form a wool-pill in the course of the present process up until press molding and a desired porosity and a desired sharp distribution of pore diameters are not obtained. The required strength of the product is not obtained with carbon fibers having a length of less than 0.02 mm. The linear carbonizing shrinkage of the carbon fibers is in the range of not more than 3.0% when the fibers are calcined at 2,000° C. Larger shrinkages may cause cracks in the product on calcination. Such short carbon fibers having a preferred shrinkage will enable production of a larger electrode substrate.

The binder employed in the invention may be useful for combining the carbon fibers with each other as a carbonaceous binder after carbonizing and, in order to obtain a desired bulk density, is a resin having a carbonizing yield in the range of from 30 to 75% by weight. Such resins include phenol resins, epoxy resins, petroleum and/or coal pitches and mixtures thereof. Powdery phenol resin or a combination thereof with powdery pitch is most preferred in dry blending and it has been found that there can be prepared with such a binder an electrode substrate having excellent properties.

The amount of a binder mixed is in the range of from 10 to 50% by weight, preferably from 20 to 40% by weight. With less than 10% by weight of a binder, the mechanical strength of a resulting substrate will be low due to an insufficient amount of a binder. On the other hand, desired pore diameter and gas permeability are not obtained with more than 50% by weight of a binder.

The pore regulator is an important material for determining pore diameters of a final product. In the invention, organic granules, 70% or more of which have a particle diameter in the range of from 30 to 300 microns, may preferably be employed in order to regulate the bulk density and pore diameters of the product. Such organic granules do not evaporate nor melt-flow at 100° C. In other words, the organic granules may be thermally deformed but should not evaporate nor melt-flow at the temperature and pressure of press molding.

The pore regulator may preferably be selected from polyvinyl alcohols, polyvinyl chlorides, polyethylenes, polypropylenes, polystyrenes and mixtures thereof which have a carbonizing yield of 30% by weight or less. With organic granules having a carbonizing yield of more than 30% by weight it will be difficult to control the porosity and/or pore diameter.

The amount of a pore regulator may be suitably selected from the range of from 20 to 50% by weight depending on the desired bulk density and pore diameters of an electrode substrate.

Preferably, the amounts to be mixed of the filler (A), the binder (B) and the pore regulator (C) will satisfy the following equation:

$$(A+C)/B = 1.5 \text{ to } 4.0$$

wherein the amounts are based on the weight. Without this range it is difficult to satisfy all the desired properties, such as bulk density, bending strength, gas permeability and electric resistance. When 10-50% by weight of the filler and 20-50% by weight of the pore regulator are used in the invention, the amount of the binder will preferably be in the range of from 20 to 40% by weight.

The materials for dense layers are similar to those for porous layers described above. For example, there can be used mixtures comprising 30-70% by weight of a filler, 20-40% by weight of a binder and 10-30% by weight of a pore regulator, examples of each material being exemplified previously. Typical examples of such mixtures are those prepared by blending, in a mixer such as Henschel mixer, 40-60% by weight of short carbon fibers having an average fiber length of 1 mm or less, 10-30% by weight of polyvinyl alcohol particles having a particle diameter distribution in the range of from 100 to 300 microns, and 25-35% by weight of powdery phenol resin having a particle diameter of 100 microns or less. In such a mixture, the average fiber length of the short carbon fibers is shorter by 0.1-0.3 mm than that of the carbon fibers used in the mixtures for porous layers, and the amount of the polyvinyl alcohol particles is smaller by 5-20% by weight than that in the mixtures for porous layers.

Examples of the materials for forming elongated holes which may be employed in the invention include textile fabrics and grating-like shaped articles of polymers, such as polyethylenes, polypropylenes, polystyrenes, polyvinyl alcohols and polyvinyl chlorides, which have a carbonizing yield (at 900° C.) of 30% by weight or less. When polymers having larger carbonizing yields are used, it may be difficult to control the formation of elongated holes and their diameters or equivalent diameters. The polymers utilized for forming elongated holes do not evaporate nor melt-flow at 100° C. In other words, the polymers may be thermally deformed but should not evaporate nor melt-flow at the temperature and pressure of press molding.

Figure 4A:
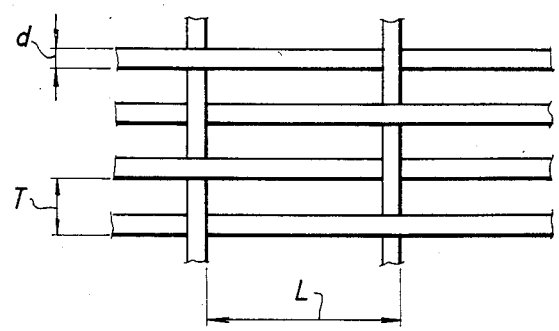
FIGS. 4a and b demonstrate schematically two examples of materials for forming the elongated holes used in the present invention.

FIGS. 4a and b are two enlarged views illustrating schematically the materials for forming elongated holes: FIG. 4a shows an example of the textile fabrics of polymer; and FIG. 4b shows an example of the grating-like shaped articles of polymer.

The textile fabric of polymer shown in FIG. 4a comprises single strands or bundles of a number of single strands which are textured so that the distance (T) between two strands or bundles parallel to the gas flow direction may be in the range of from 1.5 to 5 mm and the distance (L) between two strands or bundles perpendicular to the gas flow direction may be in the range of from 5 to 50 mm. The single strand or bundle may preferably have an approximately circular cross section with a diameter (d) in the range of from 0.5 to 3.3 mm.

Figure 4B:
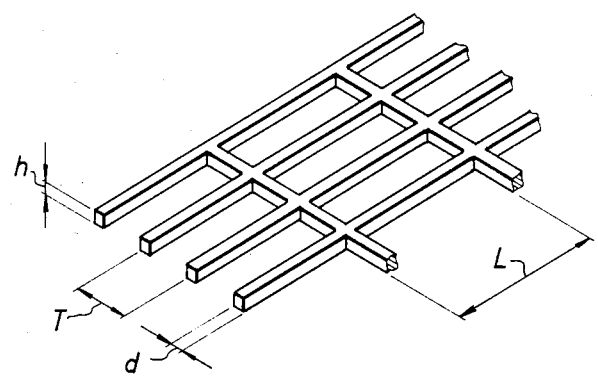

The grating-like shaped article of polymer as shown in FIG. 4b may be prepared, for example, by extrusion molding a melt of the polymer into a mold, or by press molding pellets or powder of the polymer in a mold. The cross section of a grating may be in any form, for example, circular, rectangular, square, star-like, etc. The cross sectional area of the grating may be approximately equal to the area of a circle having a diameter (equivalent diameter) in the range of from 0.5 to 3.3 mm. For example, in an article with a rectangular cross section as shown in FIG. 4b, a width (d) in the range of from 0.45 to 2.7 mm and a height (h) in the range of from 0.5 to 3.3 mm are chosen so that the cross sectional area, i.e. $d \times h$, may be equal to that of a circle having a diameter in the range of from 0.5 to 3.3 mm: that is, an equivalent diameter of the grating may be in the range of from 0.5 to 3.3 mm. The distance (T) between two gratings parallel to the gas flow direction may be in the range of from 1.5 to 5 mm, and the distance (L) between two gratings perpendicular to the gas flow direction may be in the range of from 5 to 50 mm.

In the course of preparation of an electrode substrate of the invention, these textile fabrics or grating-like shaped articles of polymer may be placed on the material for a porous layer or a dense layer in a mold, so that elongated holes may be formed in the interface between the porous layer and the dense layer. Thus, the fabrics or articles will form elongated holes in the substrate by calcination after postcuring process. A major part of the materials for forming elongated holes will evaporate and dissipate by thermal decomposition and a small amount of the materials may be carbonized by calcination.

In the present invention, the strands or bundles of the textile fabrics which are parallel to the gas flow direction will contribute to the formation of elongated holes and the strands or bundles perpendicular to the gas flow direction are utilized to link the strands or bundles parallel to the gas flow direction to each other so that the distance (T) is maintained in the above-specified range. The "gas flow direction" means herein the direction of the flow of reactant gases to be fed into the elongated holes of an electrode substrate. Similarly, the gratings of the grating-like shaped articles which are parallel to the gas flow direction will contribute to the formation of elongated holes.

Generally, the diameter or equivalent diameter of the elongated holes will be smaller by 3-7% than the original diameter or pseudo-diameter of the materials for forming elongated holes when cooled to room temperature after calcination. Thus, diameters of the strands or bundles of the starting textile fabrics, or diameters or equivalent diameters of the gratings of the starting shaped articles can be selected suitably from the above-mentioned ranges so that preferable diameters or equivalent diameters of the resulting elongated holes may be obtained, considering these contractions.

The materials described above are represented only for illustration and not limitingly. Any other suitable materials can also be used for forming elongated holes in the invention.

Examples of the materials for separators which may be used in the invention are carbon plates, compressed graphite papers (or graphite sheets), or shaped products from powdery mixtures comprising 0–80% by weight of a filler, such as short carbon fibers, fine powders of carbonaceous precursor (Japanese Patent Publication No. 31116/78), carbon particles and the like, and 20–60% by weight of a binder, such as phenol resins, fine powders of carbonaceous precursor and the like. In the powdery mixtures, the binder, for example phenol resin, is essential. If more than 60% by weight of the binder is used, the resin adversely flows during press molding process. On the other hand, less than 20% by weight of the binder will result in low strength, undesired bulk density and relatively high gas permeability of the separator in electrode substrates.

In the press molding process of the invention, the material for a porous layer, the material for forming elongated holes, the material for a dense layer, the material for a separator, the material for a dense layer, the material for forming elongated holes, and then the material for a porous layer are supplied in this order into a mold having a proper configuration, and press molded at a temperature in the range of from 70° to 170° C. and a pressure in the range of from 5 to 100 kg/cm$^2$ for a time period in the range of from 1 to 60 minutes.

Thereafter, the molded product is postcured at the temperature used in the press molding procedure for at least 2 hours, and then calcinated under an inert environment at a temperature in the range of from 800° to 3,000° C. for about one hour. In this procedure, the temperature may preferably be increased slowly, e.g. in a rate of 100°±50° C. per hour, upto about 700° C., so that any stress may not be generated, which is due to sudden shrinkage in the thermal decomposition at low temperatures. Such stress would cause exfoliation of layers and/or cracks.

In another process of the invention, an electrode substrate may be prepared in the following manner. The material for a dense layer, the material for forming elongated holes and the material for a porous layer are supplied in this order into a mold with a proper configuration, and pre-press molded at a temperature in the range of from 60° to 100° C. and a pressure in the range of from 20 to 50 kg/cm$^2$ for a time period in the range of from 10 to 30 minutes, typically at 80° C. and 30 kg/cm$^2$ for 20 minutes. The same procedures are again repeated to prepare another pre-press molded product. Then, one of the prepress molded products is placed in a mold with the porous layer being on lower side. On the dense layer of the pre-press molded product in the mold, the material for a separator is supplied, and the another pre-press molded product is then placed on the material for a separator such that the dense layer thereof is faced to the material for a separator. These materials are then press molded at a temperature in the range of from 120° to 160° C. and a pressure in the range of from 20 to 50 kg/cm$^2$ for a time period in the range of from 10 to 30 minutes, typically at 130° C. and 40 kg/cm$^2$ for 20 minutes, postcured and calcinated. Procedures and materials in this process are substantially same as above-described.

ADVANTAGES OF THE INVENTION

The electrode substrate of the present invention exhibits an improved mechanical strength, such as, for example, bending strength. There are attained further advantages according to the invention: that is, a thinner substrate may be prepared resulting in a shorter diffusion path or a lower resistance for the diffusion of reactant gases and a larger current density. On the other hand, no conventional separator sheet is required for stacking unit cells to make a fuel cell since a separator is incorporated and integrated in the substrate of the invention. Therefore, cost for preparing a fuel cell using the electrode substrates according to the invention may be markedly reduced, as compared with a conventional fuel cell prepared from, for example, ribbed electrode substrates shown in FIG. 1, which requires additional separator sheets. In addition, there is no electric nor thermal contact resistance between the separator and the dense layer in the substrate of the invention. As a result, total electric and thermal resistances of a fuel cell prepared from the substrates of the invention are markedly reduced. Thus, the electrode substrate of the invention is considered to be an ideal one.

The advantages of the invention will be more fully illustrated in Table 1 which shows the physical properties of electrode substrates of the invention and the prior art (FIG. 1) for comparison.

TABLE 1

|  | prior art | present invention |
|---|---|---|
| thickness of substrate (mm) | 2.4 | 3.6 |
| thickness of a cell (mm) | 5.8[2] | 4.1[1] |
| bending strength (kg/cm$^2$) | 100 | 250 |
| compressive strength (kg/cm$^2$) | 100 | 110 |
| electric[3] resistance (mΩ) | | |
| substrate | 8 | 10 |
| contact resistance[4] | 30 | — |
| total of a cell | 77[5] | 10 |
| thickness for gas diffusion (mm) | 1.2 | 0.5 |
| limiting current (mA/cm$^2$) | 400 | 600 |
| volumetric power (kW/m$^3$)[6] | 207 | 298 |

Note:
[1] corresponds to 11 in FIG. 2 separator sheet (0.5 mm) + two substrates + matrix layer (0.5 mm) including catalyst layers
[3] resistance per 1 cm$^2$
[4] resistance measured at contact pressure of 1 kg/cm$^2$
[5] separator sheet (1 mΩ) + two substrates + two contact resistances
[6] measured at 200 mA/cm$^2$

EXAMPLES

The present invention will be illustrated while referring to the following non-limiting examples. It should be understood that various modifications and variations may be made by those skilled in the art without undue experimentation and such modifications and variations will be included in the scope of the present invention.

In these examples, the "porosity P (%)" was determined by the following equation while assuming that the real density of a carbonaceous substrate was 1.6 g/cm$^3$:

$$P = (1 - \rho_b/1.6) \times 100$$

wherein $\rho_b$ is a measured bulk density (g/cm$^3$) of a specimen, the "bending strength (kg/cm$^2$)" of a shaped carbonaceous article was determined according to Japanese Industrial Standards (JIS) K-6911/1970 while using a specimen with a dimension of 100×10×2.5 mm, and the "average pore diameter (μm)" of a specimen was measured by a mercury porosimeter (manufactured by Carlo Erba Strumentazione, Italia). The "specific gas permeability $Q_s$ (ml/cm.hr.mmAq.)" was determined in the following manner: a cylindrical specimen of 90 mm in diameter and t mm in thickness was cut out from a shaped article to be measured, the circumferential side surface of the specimen was coated with a thermosetting resin so that gas should not diffuse out therethrough, both longitudinal end surfaces of the specimen were then put between two cylindrical gas tubes with flange holding a gasket, a predetermined amount (10 l/min) of air was applied from one end of the specimen to the other end thereof which was open to the atmosphere, the pressure loss between two ends of the specimen was measured by a manometer attached to the upstream of the gas tube and the specific gas permeability $Q_s$ was then calculated by the following equation:

$$Q_s = \frac{6 \times t \times 10^4}{50.24 \times \Delta p}$$

wherein Δp is a measured pressure loss (mmAq.) and 50.24 cm$^2$ is the real area to be measured (a circle of 80 mm in diameter). Further, the "volume resistivity $\rho_V$ (Ωcm)" was determined in the following manner: both ends of a specimen were coated with an electroconductive material and an electrical resistance between two ends of the specimen was measured according to SRIS (Standards of Japan Rubber Association) 2301-1969, and then the volume resistivity was calculated by the following equation:

$$\rho_V = R \cdot w \cdot t / l$$

wherein R is a measured resistance (Ω) between two ends of the specimen, l (cm) is a longitudinal length (in the direction to be measured), and w (cm) and t (cm) are a horizontal and a vertical lengths, respectively, defining a cross section of the specimen.

EXAMPLE 1

Preparation of Grating-like Shaped Articles of Polypropylene

Pellets of polypropylene, J-215 by TONEN SEKIYUKAGAKU K.K., Japan, were melt extruded through a screw-injection molding machine at 230° C., 500 kg/cm$^2$ into a stainless steel mold held at about 50° C.

There were prepared grating-like shaped articles of polypropylene as shown in FIG. 4b but they had gratings with circular cross section of 0.85 mm in diameter, T=2.5 mm, L=40 mm.

These articles were used as materials for forming elongated holes in the following examples.

EXAMPLE 2

A homogeneous mixture for a porous layer comprising 40% by weight of short carbon fibers, Kureha Chemical Industry Co, Ltd., 0.45 mm in average fiber length, M-104S, 30% by weight of fine granules of polyvinyl alcohol as a pore regulator, The Nippon Gosei Kagaku Kogyo Co., Ltd., Japan, P-250, 250 microns in average particle diameter, and 30% by weight of phenol resin, Asahi Yukizai Co., Ltd., Japan, was supplied into a mold with a proper configuration.

On the mixture in the mold, there were fed the material prepared in Example 1, a homogeneous mixture for a dense layer comprising 45% by weight of short carbon fibers, same as above, 35% by weight of polyvinyl alcohol, same as above, and 20% by weight of phenol resin, same as above, then a carbon plate, Toyo Carbon Co., Ltd., Japan, 0.6 mm in thickness, the homogeneous mixture for a dense layer, same as above, the material for forming elongated holes, and finally the homogeneous mixture for a porous layer, same as above, in this order.

These materials were press molded at 130° C., 40 kg/cm$^2$ for 20 minutes. The product was postcured in the mold at 130° C. for about 2 hours and calcined under nitrogen environment at 2,000° C. for one hour. The temperature had been increased in a slow rate of 100° C. per hour until to 700° C.

The resulting product had a five layer structure as shown in FIG. 2 having elongated holes with approximately circular cross section of about 0.8 mm in diameter. The physical properties of the substrate are shown in Table 2.

TABLE 2

|  | dense layer | porous layer |
|---|---|---|
| thickness (mm) | 1.0 | 0.6 |
| bulk density (g/cm$^3$)[1] | 0.82 | 0.58 |
| porosity (%)[1] | 47 | 64 |
| specific gas permeability (ml/cm · hr · mmAq.) | — | 110 |
| average pore diameter (μ)[1] | — | 30 |

TABLE 2-continued

| | dense layer | porous layer |
|---|---|---|
| bending strength (kg/cm$^2$) | 250 | |
| volume resistivity (Ωcm) | 10 × 10$^{-3}$ | |
| thermal conductivity (kcal/m · hr · °C.) | 1.8 | |

Note: $^1$exclusive of holes

EXAMPLE 3

The mixture for a dense layer described in Example 2, the material for forming elongated holes prepared in Example 1, and the mixture for a porous layer described in Example 2 were supplied into a mold with a proper configuration and pressed at 80° C., 30 kg/cm$^2$ for 20 minutes.

After removing the product out of the mold, the same procedures were repeated to prepare an additional pre-pressed product.

One of the pre-pressed products was placed into a mold with the porous layer being lower. On the dense layer of the pre-pressed product there were placed a graphite sheet Union Carbide Corp., GRAFOIL ®, 0.3 mm in thickness, and then another pre-pressed product with the dense layer being faced onto the graphite sheet. These materials were subjected to press molding at 140° C., 40 kg/cm$^2$ for 20 minutes. After pressing, the product was postcured in the mold at 140° C. for about 2 hours, and the temperature was slowly increased upto 700° C. in a rate of 100° C. per hour. Thereafter, the product was calcinated under nitrogen gas atmosphere at 2,000° C. for one hour.

The resulting substrate showed approximately the same structure and physical properties as Example 2.

What is claimed is:

1. An electrode substrate for fuel cells which comprises a porous carbonaceous layer, a dense carbonaceous layer having a bulk density larger than the porous layer, a separator, a dense carbonaceous layer having a bulk density larger than the porous layer, and a porous carbonaceous layer, and which further comprises a number of elongated holes for feeding reactant gases into a fuel cell in the interface between the porous layer and the dense layer.

2. The electrode substrate of claim 1, in which the elongated holes are parallel to each other and to the electrode surface and one side surface having no openings of the holes of the electrode substrate, are continuously elongated in the electrode substrate from one of the other side surfaces to another side surface opposite thereto, and have a diameter or equivalent diameter in the range of from 0.5 to 3 mm; and the elongated holes in one side of the separator and those in the other side of the separator have the directions perpendicular to one another.

3. The electrode substrate of claim 1, in which the porous layer has an average bulk density in the range of from 0.4 to 0.8 g/cm$^3$, a porosity in the range of from 50 to 80% and a gas permeability of 20 ml/cm.hr.mmAq. or more; and 60% or more of open pores thereof have a diameter in the range of from 5 to 50 microns.

4. The electrode substrate of claim 1, in which the dense layer has an average bulk density in the range of from 0.5 to 1.0 g/cm$^3$.

5. The electrode substrate of claim 1, in which the thickness of one porous layer is in the range of from a fiftieth to a half of the total thickness of one porous layer and one dense layer.

* * * * *